United States Patent
Li

(10) Patent No.: US 10,782,796 B2
(45) Date of Patent: Sep. 22, 2020

(54) MIXED REALITY SYSTEM WITH REDUCED POWER RENDERING

(71) Applicant: Magic Leap, Inc., Plantation, FL (US)

(72) Inventor: Xintian Li, Saratoga, CA (US)

(73) Assignee: Magic Leap, Inc., Plantation, FL (US)

( * ) Notice: Subject to any disclaimer, the term of this patent is extended or adjusted under 35 U.S.C. 154(b) by 192 days.

(21) Appl. No.: 15/814,175

(22) Filed: Nov. 15, 2017

(65) Prior Publication Data

US 2018/0136745 A1    May 17, 2018

Related U.S. Application Data

(60) Provisional application No. 62/423,154, filed on Nov. 16, 2016.

(51) Int. Cl.
*G06F 3/03* (2006.01)
*G06F 3/0346* (2013.01)
(Continued)

(52) U.S. Cl.
CPC ......... *G06F 3/0346* (2013.01); *G02B 27/017* (2013.01); *G02B 27/0172* (2013.01); *G02B 27/0179* (2013.01); *G06T 1/20* (2013.01); *G06T 15/005* (2013.01); *G06T 19/006* (2013.01); *G02B 2027/014* (2013.01); *G02B 2027/0187* (2013.01)

(58) Field of Classification Search
CPC ....... G06F 3/0346; G06F 3/03; G06T 15/005; G06T 19/006; G06T 1/20; G02B 27/017; G02B 27/0179; G02B 27/0172; G02B 2027/0187; G02B 2027/014
See application file for complete search history.

(56) References Cited

U.S. PATENT DOCUMENTS

| | | | |
|---|---|---|---|
| 9,928,655 B1* | 3/2018 | Alston | G06T 19/006 |
| 2005/0068293 A1* | 3/2005 | Satoh | G01C 9/00 345/158 |

(Continued)

OTHER PUBLICATIONS

PCT/US2017/061835, "PCT Search Report", dated Feb. 12, 2018, 6 pages.

(Continued)

*Primary Examiner* — Lunyi Lao
*Assistant Examiner* — Jarurat Suteerawongsa
(74) *Attorney, Agent, or Firm* — Kilpatrick Townsend & Stockton LLP

(57) ABSTRACT

Embodiments of the present disclosure provide for implementing a mixed reality system with less power. In some examples, a passive state of the mixed reality system can have a GPU render predictable content that does not need to be processed by a CPU. In such examples, the predictable content can be identified and rendered by the GPU while the CPU is in a low-power mode. Accordingly, embodiments of the present disclosure provide benefits not available with conventional techniques because a CPU may consume more power than a corresponding GPU. In some examples, the passive state can take advantage of the fact that predictable content can be identified and rendered without the use of the CPU. In such examples, the passive state can render predictable content that does not need to be processed by the CPU.

21 Claims, 10 Drawing Sheets

(51) Int. Cl.
*G02B 27/01* (2006.01)
*G06T 15/00* (2011.01)
*G06T 1/20* (2006.01)
*G06T 19/00* (2011.01)

(56) References Cited

U.S. PATENT DOCUMENTS

| | | | |
|---|---|---|---|
| 2010/0026714 A1* | 2/2010 | Utagawa | G02B 27/017 345/633 |
| 2012/0127284 A1* | 5/2012 | Bar-Zeev | G02B 27/017 348/53 |
| 2015/0029218 A1 | 1/2015 | Williams et al. | |
| 2015/0229839 A1 | 8/2015 | Rabii et al. | |

OTHER PUBLICATIONS

ATI Technologies, Wikipedia Nov. 8, 2016, retrieved from Internet: URL: hppts://en.wilipedia.org/w/index.php?title=ATI_Technologies&oldid=748501786.

Boos et al., "FlashBack: Immersive Virtual Reality on Mobile Devices via Rendering Memoization", Engineering, Computer Science, Published in GetMobile 2016, Jun. 20, 2016, pp. 291-303.

Extended European Search Report for corresponding European Application No. 17872026.4 dated Nov. 17, 2019, 8 pages.

\* cited by examiner

MIXED REALITY SYSTEM WITH REDUCED POWER RENDERING

CROSS-REFERENCES TO RELATED APPLICATIONS

This application claims priority to U.S. Provisional Patent Application No. 62/423,154, filed on Nov. 16, 2016, entitled "Mixed-Reality System with Reduced Power Rendering," the disclosure of which is hereby incorporated by reference in its entirety for all purposes.

BACKGROUND

Mixed reality can include combining in real time digital information with a user's field of view of a physical environment. The digital information can be anchored to the physical environment to give an impression that the digital information is in the physical environment. To implement mixed reality, the physical environment can be analyzed and the digital information generated. However, to create a realistic combination, the analysis and the generation must be performed often, which can consume a large amount of power. Therefore, there is a need in the art for improved methods and systems for reducing power consumption when implementing mixed reality.

SUMMARY

Provided are methods, systems, and computer-program products for implementing mixed reality. In some examples, a graphics processing unit (GPU) can at least partially obviate the use of a central processing unit (CPU). In such examples, a passive state can render predictable content that does not need to be processed by the CPU. In such examples, the predictable content can be rendered by the GPU while the CPU is in a low-power mode.

In some examples, the passive state can represent an intent to push as much imaging determination and rendering calculation to the GPU (rather than the CPU). The GPU can consume less power than the CPU because the GPU may need fewer data inputs to provide a sufficient output. For example, while the CPU may require full information of a current state, the GPU may need to only determine how to render content (e.g., timing, field of view limits, depth planes, type of content, etc.). And because the GPU may need fewer data inputs, a different category of sensor and architecture can be used. For example, the CPU with larger memory banks and component integration can—due to computing cycles involved—be limited to a category of sensor and architecture (classes of components) that correspond to requirements of the CPU. Or stated differently, a category of sensor and architecture that can perform faster and use less power might not be so useful to the CPU, whereas the GPU may be able to use such category of sensor and architecture and provide a sufficient output. The capability of the GPU can therefore be of a different class because the GPU can enable a different category of sensor and architecture, and not simply a better version of a CPU.

Embodiments of the present disclosure provide for implementing mixed reality with reduced power consumption. In some examples, a GPU can obviate some of the use of a CPU. In such examples, a passive power state can be provided between an idle state and an active state. In some examples, the passive state can cause the GPU to render predictable content that does not need to be processed by the CPU. In such examples, the predictable content can be identified and rendered by the GPU while the CPU is in a low-power mode. Accordingly, embodiments of the present disclosure provide benefits not available with conventional techniques because a CPU may consume more power than a corresponding GPU. In some examples, the passive state can take advantage of the fact that predictable content can be identified and rendered without the use of the CPU. In such examples, the passive state can render predictable content that does not need to be processed by the CPU.

For example, a method to present mixed reality content using a mixed reality device can be provided. The method can include obtaining sensor data associated with a physical environment. In some examples, the sensor data can be obtained using one or more sensors. The method can further include determining, by a visual processing unit (VPU), a pose of the mixed reality device using the sensor data and sending the pose of the mixed reality device to a graphics processing unit (GPU). In some examples, the pose of the mixed reality device can include a position and an orientation of the mixed reality device. In some examples, the GPU can be remote from the mixed reality device. In some examples, the method can further include sending the pose of the mixed reality device to a central processing unit (CPU). In some examples, the CPU can be operating in a low-power mode throughout the method. The method can further include identifying, by the GPU, content corresponding to the pose. In some examples, the content can be stored in a cache of the GPU prior to identifying the content. The method can further include aligning, by the GPU, the content to the physical environment, sending the aligned content to the mixed reality device, and presenting the aligned content using a display of the mixed reality device. In some examples, the method can further include determining the identified content is predictable content and obtaining the identified content from a cache of the GPU in response to determining the identified content is predictable. In other examples, the method can further include determining the identified content is dynamic content and sending a message to the CPU in response to determining the identified content is dynamic. In such examples, the message can cause the CPU to transition from the low-power mode to a high-power mode.

For another example, a system for presenting mixed reality content using a mixed reality device can be provided. The system can include a mixed reality device and a graphics processing unit (GPU), the GPU included with or separate from the mixed reality device. In some examples, the mixed reality device can include one or more sensors, a vision processing unit (VPU), and a display. In such examples, a sensor of the one or more sensors can be configured to capture sensor data. The VPU can be configured to determine a pose associated with the mixed reality device. And the pose can be determined using the sensor data. The GPU can be configured to identify content to be presented by the display of the mixed reality device, align the content to a physical environment, and transmit the aligned content to the mixed reality device to be presented by the display.

Numerous benefits are achieved by way of the present disclosure over conventional techniques. For example, embodiments of the present disclosure can provide power saving by allowing a high powered CPU to be in a low-power mode for a period of time while maintaining a consistent performance on perception and graphics rendering by a GPU. The power saving can apply to many applications (e.g., productivity software, web browsing, multimedia interactions), where power usage can be minimized when visual updates are not triggered by body motions of a user. With such power savings, it is possible to implement Always-on Mixed Reality, where a consistent visual environment can be maintained, which is essential for a user to perceive digital information as part of a physical environment. These and other embodiments of the disclosure, along with many of its advantages and features, are described in more detail in conjunction with the text below and corresponding figures.

BRIEF DESCRIPTION OF THE DRAWINGS

Illustrative embodiments are described in detail below with reference to the following figures.

DETAILED DESCRIPTION

In the following description, for the purposes of explanation, specific details are set forth in order to provide a thorough understanding of embodiments of the disclosure. However, it will be apparent that various embodiments may be practiced without these specific details. The figures and description are not intended to be restrictive.

The ensuing description provides exemplary embodiments only and is not intended to limit the scope, applicability, or configuration of this disclosure. Rather, the ensuing description of the exemplary embodiments will provide those skilled in the art with an enabling description for implementing an exemplary embodiment. It should also be understood that various changes may be made in the function and arrangement of elements without departing from the spirit and scope of the disclosure as set forth in the appended claims.

Traditionally, mixed reality devices (e.g., wearable mixed reality glasses) handle power consumption by using two states: idle and active. In the idle state, no content is rendered. In the active state, a central processing unit (CPU) determines/identifies content and a graphics processing unit (GPU) renders the determined/identified content. However, this two state system can consume a large amount of power in the active state.

Embodiments of the present disclosure provide for implementing mixed reality with less power. In some examples, the GPU can obviate some of the use of the CPU. In such examples, a passive power state can be provided between an idle state and an active state. In the passive state, the GPU determines/identifies/predicts content and renders the predictable content, and the CPU does not determine/identify/predict content. In such examples, the predictable content can be identified and rendered by the GPU while the CPU is in an idle/semi-idle state, also referred to as a low-power mode. Accordingly, embodiments of the present disclosure provide benefits not available with conventional techniques in which the CPU may consume more power than the corresponding GPU. In some examples, the passive state can take advantage of the fact that predictable content can be identified and rendered by the GPU without the use of the CPU. In such examples, in the passive state, the GPU can render predictable content that does not need to be processed by the CPU.

Figure 1:
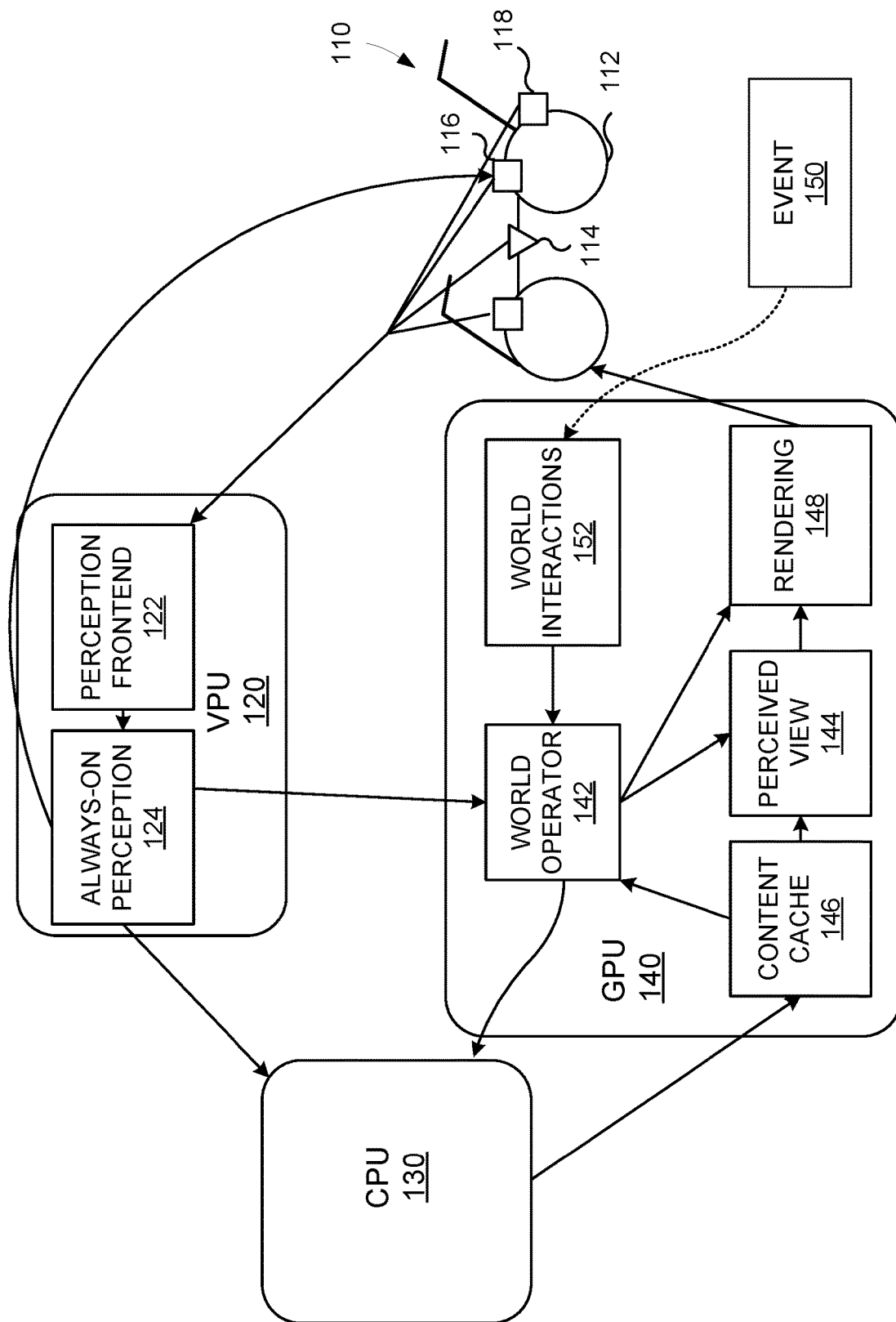
FIG. 1 illustrates an example of a mixed reality system for implementing a passive power state, according to one embodiment.

FIG. 1 illustrates an example of a mixed reality system for implementing a passive power state, according to one embodiment. The mixed reality system can provide a persistent mixed reality environment that includes virtual content overlaid on a physical environment. For example, the virtual content can appear in the physical environment over time.

The mixed reality system can include a mixed reality device 110. The mixed reality device 110 can present virtual content to a user. The mixed reality device 110 can also allow the user to see at least a portion of a physical environment in front of the user while the virtual content is being presented to the user. In some examples, the virtual content can be presented to the user using one or more displays (e.g., display 112). In some examples, the mixed reality system can include one or more mixed reality devices.

In some examples, the mixed reality device 110 can include one or more sensors for generating sensor data. The sensor data can be used to identify a pose (e.g., a position and/or an orientation) of the mixed reality device 110. As an example, the sensor data can be collected by a camera, which can provide one or more images of the physical environment. The physical environment can include an area within a field of view of the user. In some implementations, the physical environment can also include areas outside of the field of view of the user. In such implementations, the areas outside of the field of view of the user can be imaged using one or more cameras. While sensors illustrated in FIG. 1 are located in particular positions, the sensors can be in different positions. In addition, there can be more or less sensors.

In some examples, a sensor of the one or more sensors can be an always-on sensor 114 or a vision sensor 116. The always-on sensor 114 can be a low-power sensor that can detect one or more attributes of the physical environment. For example, the always-on sensor 114 can be a temperature sensor, a pressure sensor, a flow sensor, a level sensor, a proximity sensor, a displacement sensor, a biosensor, a gas sensor, a chemical sensor, an acceleration sensor, a moisture sensor, a humidity sensor, a speed sensor, a mass sensor, a tilt sensor, a force sensor, a viscosity sensor, or any combination thereof.

In some examples, the always-on sensor 114 can be set to operate in one or more data generation rate modes (sometimes referred to as power modes) that specify a rate at which data is generated by the always-on sensor 114. For example, the always-on sensor 114 can be set to operate in a low-rate mode that causes the data generation rate to be lower than when the always-on sensor 114 is set to operate in a high-rate mode. In some examples, different always-on sensors 114 can be set to operate at different rates for generating data. For example, a first always-on sensor can be set to operate at a first rate and a second always-on sensor can be set to operate at a second rate. In such an example, the first rate and/or the second rate can be a variable rate (e.g., changes over time).

The vision sensor 116 (e.g., a camera) can capture an image of the physical environment. The vision sensor 116 can also be set to operate in one or more modes that specify a rate at which images are captured by the vision sensor 116. For example, the vision sensor 116 can be set to operate in a low-rate mode that causes an image capture rate to be lower than when the vision sensor 116 is set to operate in a high-rate mode.

In some examples, the mixed reality device 110 can include one or more combination sensors (e.g., combination sensor 118), which can include the functionality of the always-on sensor 114 and the vision sensor 116. In such examples, the combination sensor 118 can be set to operate in one or more modes. For example, a first mode of the combination sensor 118 can correspond to the functionality of the always-on sensor 114. A second mode of the combination sensor 118 can correspond to the functionality of the vision sensor 116. In some examples, the different modes can provide different rates at which data is obtained. In one example, the vision sensor function can operate using a frame rate of 50 frames per second while in the first mode and 5 frames per second while in the second mode. In another example, the vision sensor function can operate using a frame rate of 5 frames per second in the second mode while the always-on sensor function can operate using a rate of 10 senses per second.

The mixed reality system can further include one or more processors (e.g., a vision processing unit (VPU) 120, a CPU 130, and/or a GPU 140). It should also be noted that while a single VPU 120, CPU 130, and GPU 140 is described, one or more VPUs 120, one or more CPUs 130, and/or one or more GPUs 140 can be used. The VPU 120 can be included with or be remote from the mixed reality device 110. In some examples, the VPU 120 can be set to operate in one or more power modes (e.g., low and high). In some examples, the VPU 120, operating in any power mode, can consume less power than the CPU 130.

In some examples, the CPU 130 can be included with or be remote from the mixed reality device 110. When the CPU 130 is remote from the mixed reality device 110, the CPU 130 can be located, for example, with a battery pack for the mixed reality device 110. In some examples, the CPU 130 can consume more power than the VPU 120 and/or the GPU 140.

In some examples, the GPU 140 can be included with or be remote from the mixed reality device 110. When the GPU 140 is remote from the mixed reality device 110, the GPU 140 can be located, for example, with the battery pack for the mixed reality device 110. In some examples, the GPU 140 can be set to operate in one or more power modes (e.g., low and high). In such examples, the GPU 140, in any power mode, can consume less power than a CPU (e.g., the CPU 130).

In some examples, the VPU 120 can include a perception frontend module 122. The perception frontend module 122 can receive sensor data from one or more sensors (e.g., the always-on sensor 114, the vision sensor 116, and/or the combination sensor 118) of the mixed reality device 110. The perception frontend module 122 can identify a pose of the mixed reality device 110 using the sensor data. For example, the pose can be identified using data from the always-on sensor 114, the vision sensor 116, the combination sensor 118, or any combination thereof. In some examples, the pose can define a position and/or orientation of the mixed reality device 110 (e.g., abscissa, ordinate, applicate, pitch, yaw, roll, or any combination thereof).

In some examples, the perception frontend module 122 can also identify one or more features (sometimes referred to as extracted information) of the physical environment. For example, a corner or an edge of an object in the physical environment can be identified. The one or more features of the physical environment can allow the VPU 120 to send the one or more features to other processors rather than sending an image of the physical environment. In some examples, the one or more features can describe the physical environment without having to include all of the pixel information that an image would include. In such examples, the one or more features can be used to create a representation of the physical environment to pass between components.

In some examples, the VPU 120 can also include an always-on perception module 124. In such examples, the always-on perception module 124 can receive the pose and/or the one or more features from the perception frontend module 122. In some examples, the always-on perception module 124 can send the pose to the CPU 130 and/or the GPU 140. In some examples, the always-on perception module 124 can cause the CPU 130 and/or the GPU 140 to transition from a low-power mode to a high-power mode in response to receiving the pose from the always-on perception module 124. In some examples, the always-on perception module 124 can also send the one or more features to the CPU 130 and/or the GPU 140.

In some examples, one or more of the functions of either the perception frontend module 122 or the always-on perception module 124 can occur on a different component of the VPU 120 (e.g., the pose can be determined by the always-on perception module 124). In other examples, one or more of the functions of either the perception frontend module 122 or the always-on perception module 124 can occur on a component (e.g., module or device) remote from the VPU 120.

As described above, the CPU 130 can receive the pose of the mixed reality device 110 and/or the one or more features of the physical environment, for example, from the VPU 120. In some examples, the CPU 130, either alone or in combination with the VPU 120, can create a representation of the physical environment. In such examples, the representation can be a 3D reproduction of the physical environment.

In some examples, the CPU 130 can identify virtual content to place into the representation of the physical environment. In such examples, the virtual content can be identified based on an application executing on the CPU 130. For example, a game can be executing on the CPU 130 that controls an experience of the user using the mixed reality device 110. In some examples, a world view can be generated that includes the representation of the physical environment and the virtual content. In such examples, the world view can be the virtual content inserted into the representation of the physical environment such as to define where content should be located in the physical environment. In some examples, the virtual content can be a three-dimensional representation.

In some examples, the CPU 130 can determine how virtual content should look at a particular time. In such examples, the CPU 130 can associate one or more indications of time with the virtual content such that the GPU 140 can determine when to render and send the virtual content to one or more displays of the mixed reality device 110 to be presented to the user.

In some examples, content can have a predictable motion (e.g. a clock, a cloud, a surface of a lake, or the like) over a period of time. In such examples, the CPU 130 can identify and generate content for one or more time periods. The one or more time periods can be associated with the predicatable content. In an illustrative example, the predictable content can be a clock mounted on a wall. The content representing the clock can include a time period in which the clock can be re-rendered (e.g. once every minute) so that the clock appears at the correct time to the user of the mixed reality device 110. In some example, when the digital information represents a static object (e.g. a table), the digital information does not have an associated time period for which to render the content.

In some examples, the CPU 130 can send the representation of the physical environment, the virtual content, and/or the world view to the GPU 140. In such examples the virtual content can be in a form of pixel information.

In some examples, the GPU 140 can include a world operator 142, a perceived view module 144, content cache 146, a rendering module 148, a world interactions module 152, or any combination thereof. In such examples, the content cache 146 can receive and store data received from the CPU 130 (such as content to be presented by the mixed reality device 110 and the world view described above) and/or the VPU 120 (such as a pose). The representation of the physical environment, the content to be presented by the mix-reality device 110, and/or the world view can be individually accessible and consumable in the content cache 146.

In some examples, the world operator 142 can request the world view from the content cache 146. In such examples, the content cache 146 can send the world view stored in the content cache 146 to the world operator 142 in response to the request. In other examples, the content cache 146 can either periodically send the world view to the world operator 142 or the content cache 146 can send the world view to the world operator 142 when the world view is updated (by, for example, the CPU 130). In some examples, the world view may only be a portion of the physical environment associated with the mixed reality device 110. When the world view is a partial world view, the world operator 142 can produce a complete world view using information received directly from the VPU 120 and/or from other information stored in the content cache 146.

In some examples, the world operator module 142 can receive the pose and/or the one or more features from the always-on perception module 124. In some examples, the world operator module 142 can update the world view stored in the content cache 146 based on the pose and/or the one or more features.

Using the pose and the world view, the world operator module 142 can identify content to obtain. In some examples, the world operator 142 can also determine a pose of virtual content corresponding to the pose of the mixed reality device 110. For example, when the mixed reality device 110 is facing a particular direction at a particular location, the world operator module 142 can determine a position and/or orientation of virtual content.

In some examples, when the world operator module 142 identifies content, the world operator module 142 can also determine a type of the content (e.g., whether the content is dynamic or predictable).

Dynamic content can include an object that has motion not easily captured in logic operable by a GPU. In some examples, dynamic content can depend on an interaction of a user and/or a particular pose of the mixed reality device 110. In such examples, the CPU 130 would need to analyze the interaction and/or the pose to determine the content. In some examples, dynamic content can include content that is not predictable. In such examples, the dynamic content can be content with visual appearance that may change over time. Additionally, the dynamic content can include content that may not be efficiently rendered by the GPU 140 utilizing existing cached content and input from the always-on perception module 124, which can be provided to the world operator module 142. One example of such dynamic content can be a chess game application or messaging chat application, where the rendering of an update depends on the input of the remote user. Another example of a dynamic content can be a sophisticated 3D structure, where GPU 140 may not have enough memory to cache the information in the content cache 146 and to determine a position of the sophisticated 3D structure.

Predictable content can include an object that has standard or predictable movement over time. In some examples, predictable content can be content with a visual appearance over space and time that can be determined with existing cached content in the content cache 146 and input from the always-on perception module 124, which can be provided as input to the world operator module 142. For example, predictable content can have motion that depends on its own physics and the physics of the physical environment rather than on something external (e.g., an interaction by a user). In some examples, predictable content can have its motion pre-programmed such that extra processing power to determine its motion is unnecessary. In such examples, the motion of the predictable content can be included in the content cache 146 such that the CPU 130 does not need to be used. Predictable content can also include static content that does not have motion over time. In some examples, static content can still move according to adjustments in the orientation of the static content resulting from a change or updated pose of the mixed reality device and the pose of the static content.

Examples of predictable content can include a clock, a water stream, and a torch. To illustrate an example of predictable content, a clock example will be described. While the clock is not still, its movements can be predictable. In fact, pixel information associated with the clock can be kept in the content cache 146. In addition, logic that identifies how the clock should move can also be included in the content cache 146. In some examples, the logic can correspond to moving a needle of the clock every minute. Another example of predictable content is a surface of a lake when there is no external turbulence. The character of waves of the surface can be recreated based on simple randomization. For predictable content, the predictable content can be stored in the content cache 146 such that the CPU 130 does not need to generate pixel information associated with the predictable content when the predictable content is to be displayed to the user. In such examples, the CPU 130 does not need to transition from a low-power mode to a high-power mode, thereby saving power.

In some examples, the type of the content can be determined by identifying whether the content for the pose of the mixed reality device 110 is located in the content cache 146. In such examples, the world operator module 142 can also identify whether the content cache 146 includes the content in a pose that corresponds to the pose of the mixed reality device 110. If the world operator module 142 determines that the content is dynamic content, the world operator module 142 can send a message to the CPU 130 to cause the CPU 130 to transition from a low-power mode to a high-power mode so that a state of the dynamic content can be generated. In such examples, the message can include the world view. In some examples, the world view included in the message can indicate to the CPU 130 which content the CPU 130 needs to generate. Limiting the content the CPU 130 needs to generate can shorten an amount of time the CPU 130 is in a high-power mode.

In response to receiving the message, the CPU 130 can analyze the pose received from the always-on perception module 124. In some examples, the CPU 130 can also analyze the world view received from the world operator module 142. By analyzing the pose and/or the world view, the CPU 130 can determine content to be presented by the mixed reality device 110. In such examples, the CPU 130 can generate and send pixel information associated with the content to the content cache 146 of the GPU 140.

In some examples, the world operator module 142 can determine that a determination of the world view is no longer needed for an amount of time or in a particular area. In such examples, the world operator module 142 can send the rendering module 148 one or more frames of pixel information to be displayed using the mixed reality device 110. In some examples, the world operator module 142 can also send the rendering module 148 an indication of when to display each frame of one or more frames. In such examples, the GPU 140 can avoid having to determine a world view and/or reorient the content. In some examples, the indication can correspond to both a time and a particular pose. In such examples, when both the time and the particular pose are satisfied, the rendering module 148 can cause the mixed reality device 110 to display the frame.

In some examples, the world operator module 142 can send the world view to the perceived view module 144. In such examples, the world operator module 142 can also send the pose of the mixed reality device 110 to the perceived view module 144. In some examples, the perceived view module 144 can obtain the content indicated in the world view from the content cache 146 according to the pose.

In some examples, the perceived view module 144 can modify the content based on the pose, such that the content is oriented correctly to be presented by the mixed reality device 110. After the perceived view module 144 has modified the content to correspond to the pose, the modified content can be sent to the rendering module 148. The rendering module 148 can render the modified content such that the modified content can be displayed using the mixed reality device 110 (e.g., ensuring that the modified content sticks to the physical environment). In some examples, the rendering module 148 can align the modified content with the representation of the physical environment to ensure that the modified content is in a correct position.

As described above, in some examples, the GPU 140 can further include the world interactions module 152. The world interactions module 152 can receive an event 150. The event 150 can affect content presented by the mixed reality device 110. In some examples, the world interactions module 152 can send the event 150 to the world operator module 142 for processing. As discussed above, the pose can be sent from the always-on perception module 124 to the world operator module 142. Accordingly, the processing performed by the world operator module 142 can utilize the event 150 and/or the pose.

In some examples, the event 150 can be associated with actions associated with data received by one or more sensors (e.g., the always-on sensor 114 and/or the vision sensor 116), one or more remote devices, or the like. The event can be a gesture. The gesture can include a motion of a user's appendage (e.g., moving a finger from left to right to indicate a swiping motion). As an example of actions associated with data received by one or more remote devices, a signal from a totem can be an event 150. A totem can be a device that can send the event 150 to the GPU 140. In some examples, the totem can include a communication module (e.g., Bluetooth). An example of a totem is a controller or an internet of things (IoT) device. To illustrate an IoT device, an alarm device in a home can be described. For example, the alarm device can indicate that a person is at a door of the home. Based on the indication from the alarm device, the GPU 140 can render a notification of the person to be displayed by the mixed reality device 110.

Figure 2:
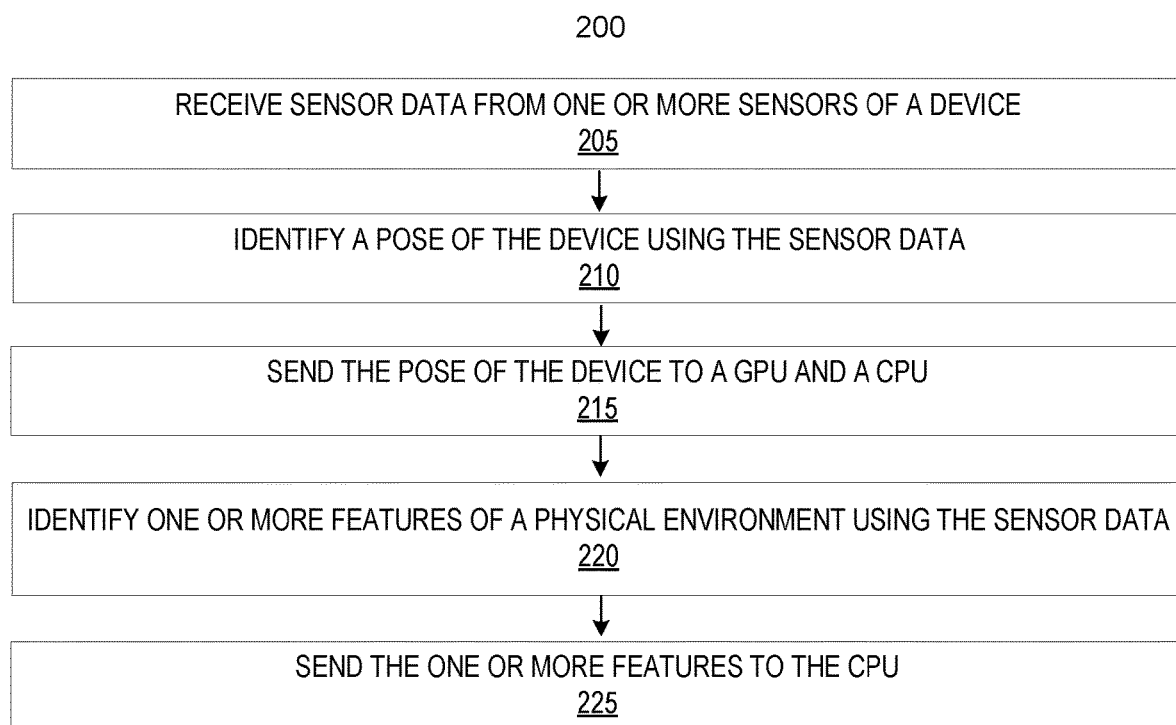
FIG. 2 illustrates an example of a process performed by a visual processing unit (VPU) for presenting mixed reality, according to one embodiment.

FIG. 2 illustrates an example of a process 200 performed by a VPU (e.g., the VPU 120) for presenting mixed reality, according to one embodiment. The process 200 includes receiving sensor data (e.g., images, GPS location, etc.) from one or more sensors (205). The one or more sensors may be included in a mixed reality device. In some examples, the sensor data can include data generated by the one or more sensors. The one or more sensors can include an always-on sensor 114 (e.g., the always-on sensor 114), a vision sensor (e.g., the vision sensor 116), and/or a combination sensor (e.g., the combination sensor 118). In some examples, the sensor data can be received by a perception frontend module (e.g., the perception frontend module 122) of the VPU. In some examples, the one or more sensors can be set to operate in a high-power mode (e.g., the vision sensor 116 can operate at a high frame rate in the high-power mode and at a low frame rate in a low-power mode).

The process 200 further includes identifying a pose of the mixed reality device using the sensor data (210). In some examples, the pose can be generated by the perception frontend module. In such examples, the perception frontend module can send the pose to an always-on perception module (e.g., the always-on perception module 124). In some examples, because components of the mixed reality system might take time to process, a pose at a current time can be different than a pose when the content would be presented. In such examples, the pose can be associated with a time in the future. In particular, the pose can be a prediction of a field of view of the mixed reality device at a time when content would be presented using the mixed reality device.

The process 200 further includes sending the pose of the mixed reality device to a CPU (e.g., the CPU 130) and/or a GPU (e.g., the GPU 140) (215). In such examples, the pose can be sent to a world operator module (e.g., the world operator module 142) of the GPU. In some examples, the pose can be sent simultaneously to the CPU and the GPU. In other examples, the pose can be sent to one of the CPU and the GPU and then to the other.

The process 200 further includes identifying one or more features of a physical environment using the sensor data (220). For example, a corner or an edge of an object in the physical environment can be identified. In some examples, the one or more features can relate to the field of view associated with the pose and/or one or more areas that are not included in the field of view. The one or more features of the physical environment can allow the VPU to send the one or more features to other processors rather than sending an image of the physical environment. In some examples, the one or more features can describe the physical environment without having to include all of the pixel information that an image would include. In such examples, the one or more features can be used to create a representation of the physical environment to pass between components. The process 200 further includes sending the one or more features to the CPU (225).

Figure 3:
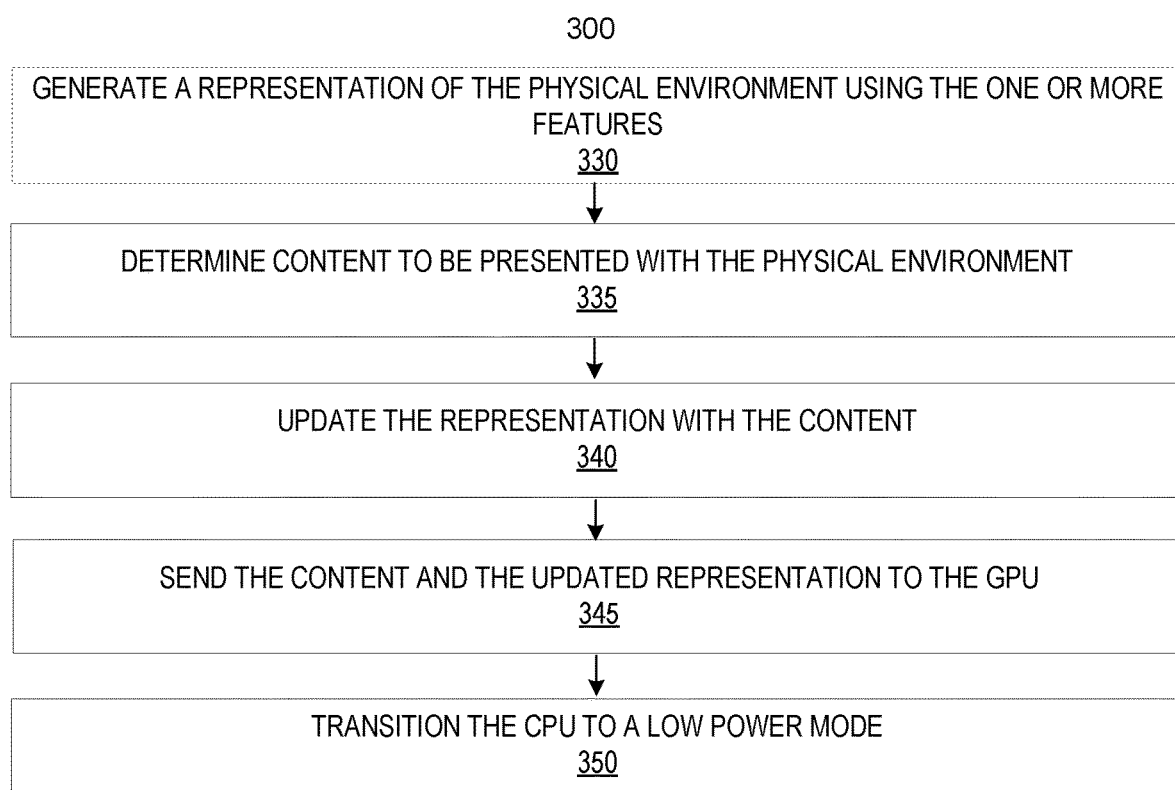
FIG. 3 illustrates an example of a process performed by a central processing unit (CPU) for presenting mixed reality, according to one embodiment.

FIG. 3 illustrates an example of a process 300 performed by a CPU (e.g., the CPU 130) for presenting mixed reality, according to one embodiment. In such an example, the CPU can begin by transitioning from a low-power mode to a high-power mode. In other examples, the CPU can already be in a high-power mode. In some examples, the process 300 can follow after the process 200. The process 300 can assume that either a representation is not stored in a content cache (e.g., the content cache 146) of a GPU (e.g., the GPU 140) or that an initial identification of content to be presented using the mixed reality device indicates that the content is dynamic.

The process 300 includes generating a representation of a physical environment using one or more features of the physical environment (330) and/or one or more images of the physical environment. The one or more features can describe the physical environment without having to include all of the pixel information that an image would include. The representation can be a computer-simulated recreation of the physical environment in three dimensions. In some examples, the CPU and/or a VPU (e.g., the VPU 120) can generate the representation.

The process 300 further includes determining content to be presented with the physical environment (335). In some examples, the content can be virtual content that is overlaid on a view of the physical environment such that the content appears to be in the physical environment. In some examples, the content can be determined using an application executing on the CPU. The application can determine the content based on the representation and/or a pose of the mixed reality device.

The process 300 further includes updating the representation with the content (340). In some examples, the representation can be updated by inserting the determined content into the representation. In other examples, the representation can be updated by associating position information corresponding to the representation with the content such that the content can include information needed to be placed in a correct position and orientation in the representation.

The process 300 further includes sending the content and the updated representation to the GPU (345). In some examples, the CPU can send the content to the GPU. In such examples, the content can be pixel information that can allow the GPU to render the content for the mixed reality device. The process 300 further includes transitioning the CPU to a low-power mode (350). In some examples, the CPU can transition to the low-power mode in response to the content and the updated representation being sent.

Figure 4:
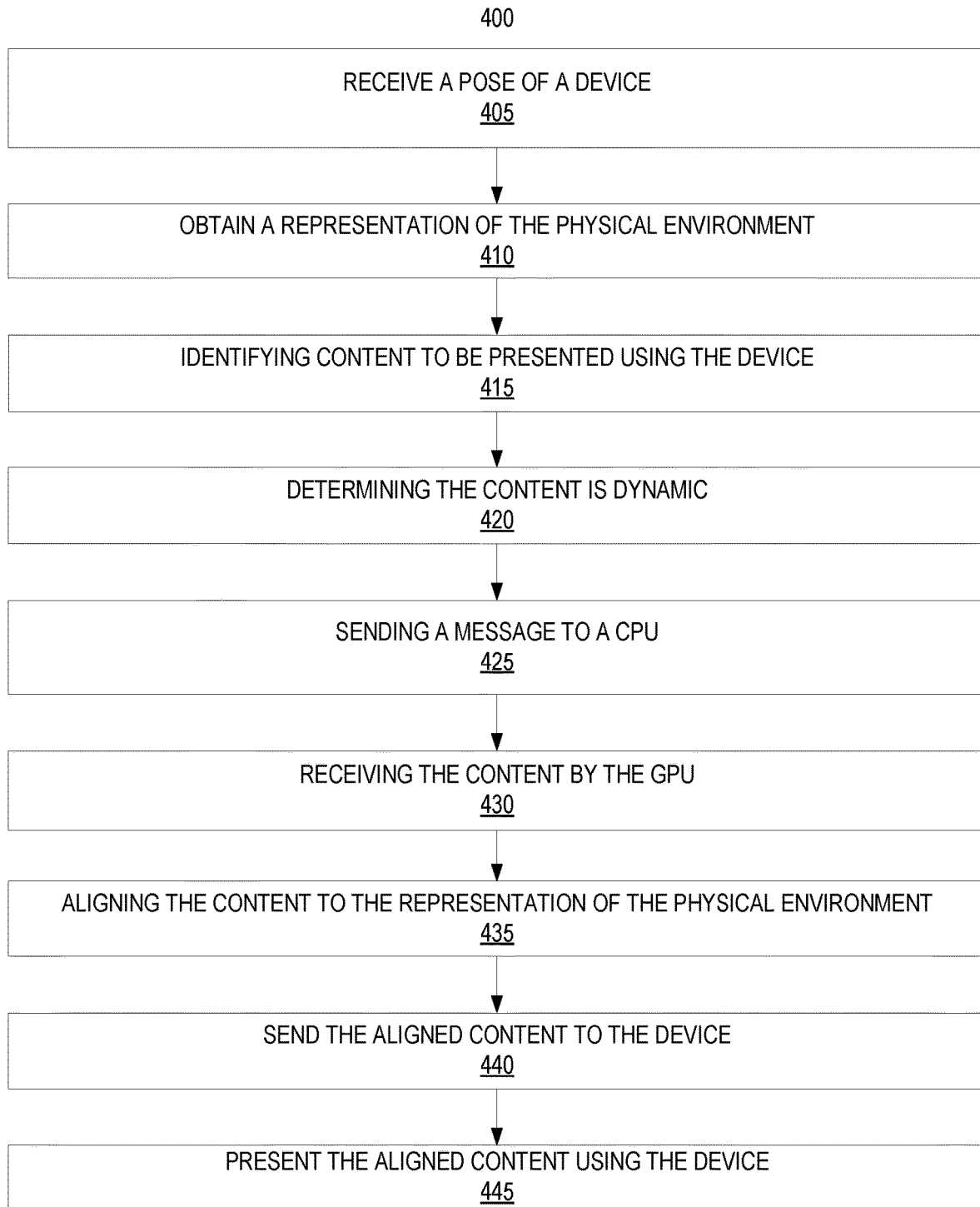
FIG. 4 illustrates an example of a process for presenting dynamic content using a mixed reality device, according to one embodiment.

FIG. 4 illustrates an example of a process 400 for presenting dynamic content using a mixed reality device (e.g., the mixed reality device 110). At the beginning of the process 400, a CPU (e.g., the CPU 130) and/or a VPU (e.g., the VPU 120) can be set to operate in a low-power mode.

The process 400 includes receiving a pose of a device (e.g., the mixed reality device) (405). In some examples, the pose can be received by a world operator module (e.g., the world operator 142) of a GPU (e.g., the GPU 140). In such examples, the pose can be received from the VPU. In some examples, the pose can be identified using sensor data of a physical environment around the mixed reality device as described above. In such examples, the pose can be an orientation and/or a location of the mixed reality device.

The process 400 further includes obtaining a representation of the physical environment (410). In some examples, the world operator module can obtain the representation. In such examples, the representation of the physical environment can be stored in a content cache (e.g., the content cache 146) of the GPU. In some examples, the representation can be the updated representation described above.

The process 400 further includes identifying content to be presented by the mixed reality device (415). In some examples, the identifying can be performed by the world operator module and/or a perceived view module (e.g., the perceived view module 144) of the GPU. The identifying can include determining a portion of the representation that corresponds to the pose. For example, a field of view of the mixed reality device can be the portion of the representation. In such an example, the pose can indicate a direction that the mixed reality device is facing.

Once the portion of the representation is identified, the world operator module and/or the perceived view module can identify content that is within the portion of the representation. If the world operator module identifies the content, the world operator module can send one or more indications of the content as well as either a pose for the content or a pose of the mixed reality device to the perceived view module. If the perceived view module identifies the content, the perceived view module can have received the representation and/or the pose in order to identify the content.

The process 400 further includes determining the content is dynamic (420). In some examples, the content can be determined to be dynamic based on one or more indications included in the representation. In other examples, the content can be determined to be dynamic based on whether the content is located in the content cache. In some examples, determining the content is dynamic can be based on determining whether a world interaction has occurred. In such examples, a world interaction (e.g., the event 150) can be received and identified by a world interactions module (e.g., the world interactions module 152) of the GPU. If a world interaction has occurred, the content can be determined to be dynamic.

The process 400 further includes sending a message to a CPU (425). In some examples, the message can be sent in response to determining that the content is dynamic. In some examples, the message can include the representation and/or the pose. In some examples, the message can cause the CPU to perform one or more steps described in FIG. 3, including determining content to be presented and sending the content to the GPU.

The process 400 further includes receiving the content by the GPU (430). In some examples, the content can be received by the content cache. In such examples, the content can be determined by the CPU. In some examples, after the content is received by the content cache, the perceived view module can obtain the content from the content cache. In some examples, the content can be obtained by sending an indication of the content to the content cache. In such examples, the indication can include a pose of the content. In other examples, the content can be a three-dimensional representation of the content in a default pose. In such examples, the perceived view module can change the pose of the content to correspond to the pose of the mixed reality device. In some examples, the perceived view module can also ensure correct occlusion between a first content and a second content and the first content and the physical environment. Occlusion can describe when an object in the physical environment will at least partially block a view of the content to be overlaid on the physical environment.

The process 400 further includes aligning the content to the representation of the physical environment (435). Aligning can include positioning the content in a field of view of the mixed reality device such that the content appears in a position corresponding to the representation. In other words, the aligning can make the content stick relative to the physical environment. In some examples, the aligning can be performed by a rendering module (e.g., the rendering module 148) of the GPU. The process 400 further includes sending the aligned content to the mixed reality device (440) and presenting the aligned content using the mixed reality device (445).

Figure 5:
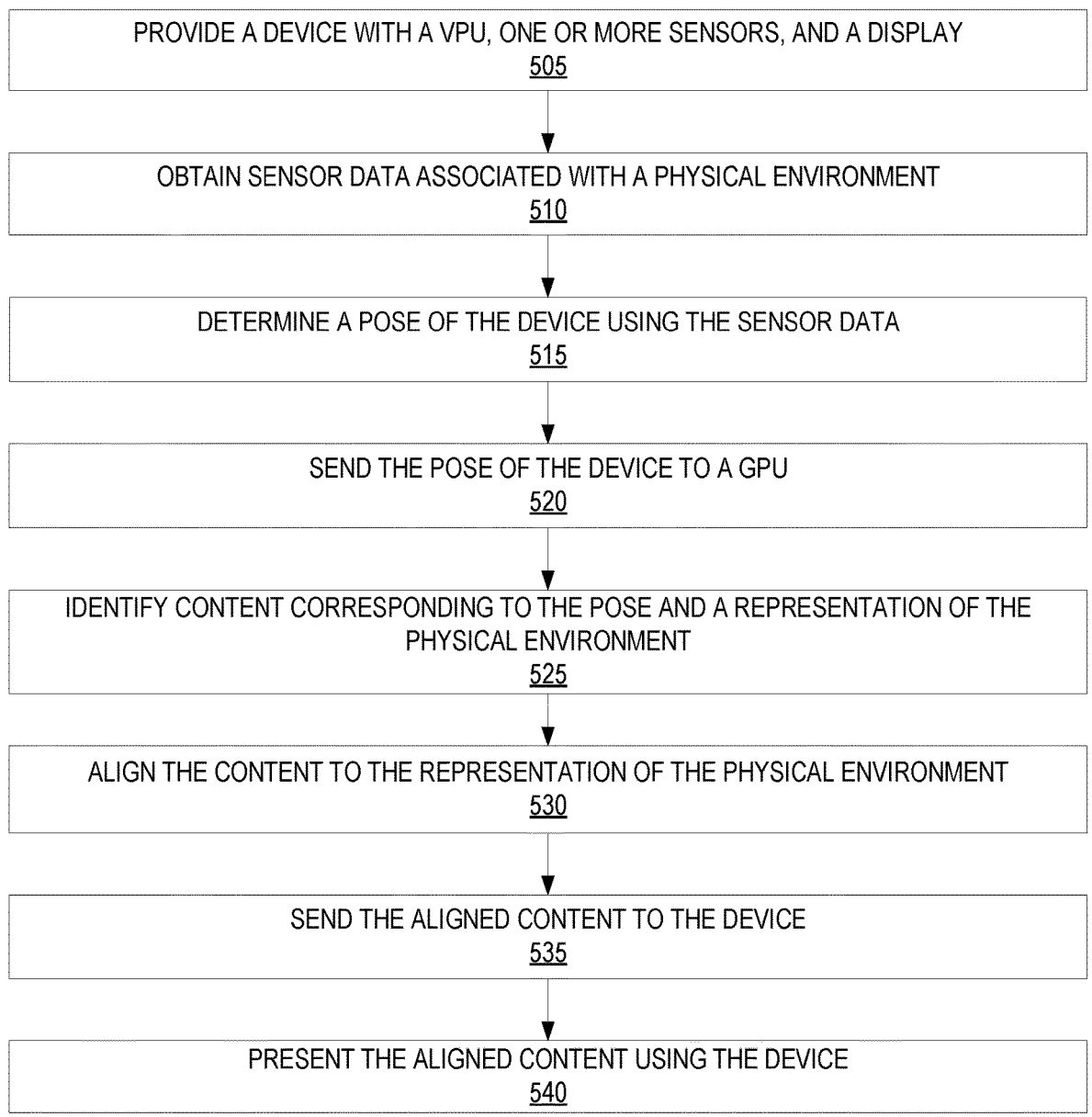
FIG. 5 illustrates an example of a process for presenting predictable content using a mixed reality device, according to one embodiment.

FIG. 5 illustrates an example of a process 500 for presenting predictable content using a mixed reality device, according to one embodiment. The process 500 includes providing a mixed reality device. The mixed reality device can include a VPU (e.g., the VPU 120), one or more sensors (e.g., the always-on sensor 114, the vision sensor 116, and/or the combination sensor 118), and a display (505). In some examples, a sensor can be a camera, an accelerometer, a gyroscope, a totem, or a global positioning system. Others sensors can be used.

The process 500 further includes obtaining sensor data associated with a physical environment (510). In some examples, the sensor data can be received from an always-on sensor (e.g., the always-on sensor 114), a vision sensor (e.g., the vision sensor 116), a combination sensor (e.g., the combination sensor 118), or any combination thereof. In some examples, the sensor data can be obtained by a perception frontend module (e.g., the perception frontend module 122) of the VPU.

The process 500 further includes determining a pose of the mixed reality device using the sensor data (515). In some examples, the pose can be in a configuration space of the mixed reality device. In such examples, the pose can define a position and an orientation of the mixed reality device.

The process 500 further includes sending the pose of the mixed reality device to a GPU (e.g., the GPU 140) (520). In some examples, the GPU can be remote from the device. The process 500 further includes identifying content corresponding to the pose and/or a representation of the physical environment (525). In some examples, the content can be identified to be predictable content. In such examples, the content can be identified to be predictable content based on one or more indicators in the representation. In other examples, the content can be identified to be predictable content based on whether the content is stored in a content cache (e.g., the content cache 146) of the GPU prior to being identified by the GPU.

In some examples, the representation can indicate that no content should be rendered. In such examples, steps 530 through 540 can be skipped. In addition, in some examples, a determination can be made of a duration that no content should be presented. In such examples, the duration can be temporal or spatial.

To illustrate when no content should be presented, a use case of a user in a living room can be described. When the user walks to a bathroom, a determination can be made that the next 10 meters there will be no digital content. During that time, everything can be idle except what is needed to determine whether 10 meters have passed.

The process 500 further includes aligning the content to the representation of the physical environment (530), sending the aligned content to the mixed reality device (535), and presenting the aligned content using the mixed reality device (540). In some examples, aligning the content can include determining an orientation to display the content relative to the pose of the mixed reality device and modifying the content based on the orientation to display the content. In some examples, the content can be modified by a perceived view module (e.g., the perceived view module 144) of the GPU. Modifying can include configuring the content to be a correct orientation for display.

In some examples, the VPU can determine that sensor data can be received at a slower rate. In such examples, the one or more sensors can be set to operate in a low-power mode. In some examples, the VPU can set the one or more sensors in the low-power mode. In some examples, the low-power mode of the one or more sensors can cause a sensor of the one or more sensors to generate data less often (at a lower rate). In some examples, the low-power mode of the one or more sensors can cause a sensor of the one or more sensors to not generate data. In addition, in some examples, a set of sensors of the one or more sensors can be idle when the set of sensors are not needed.

It should be appreciated that the specific steps illustrated in FIG. 5 provide a particular method of presenting mixed reality content using a mixed reality device, according to one embodiment. Other sequences of steps may also be performed according to alternative embodiments. For example, alternative embodiments of the present disclosure may perform the steps outlined above in a different order. Moreover, the individual steps illustrated in FIG. 5 may include multiple sub-steps that may be performed in various sequences as appropriate to the individual step. Furthermore, additional steps may be added or removed depending on the particular applications. One of ordinary skill in the art would recognize many variations, modifications, and alternatives.

Processes 200, 300, 400, and 500 are illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes 200, 300, 400, and 500 may be performed under the control of one or more computer systems configured with executable instructions and may be implemented as code (e.g., executable instructions, one or more computer programs, or one or more applications) executing collectively on one or more processors, by hardware, or combinations thereof. The code may be stored on a computer-readable storage medium, for example, in the form of a computer program comprising one or more instructions executable by one or more processors. The computer-readable storage medium may be non-transitory.

FIGS. 6-10 describe possible configurations of components of a mixed reality system, according to various embodiments. While the possible configurations provide specific details of each configuration, a person of ordinary skill in the art will recognize that this disclosure covers other configurations for the components.

Figure 6:
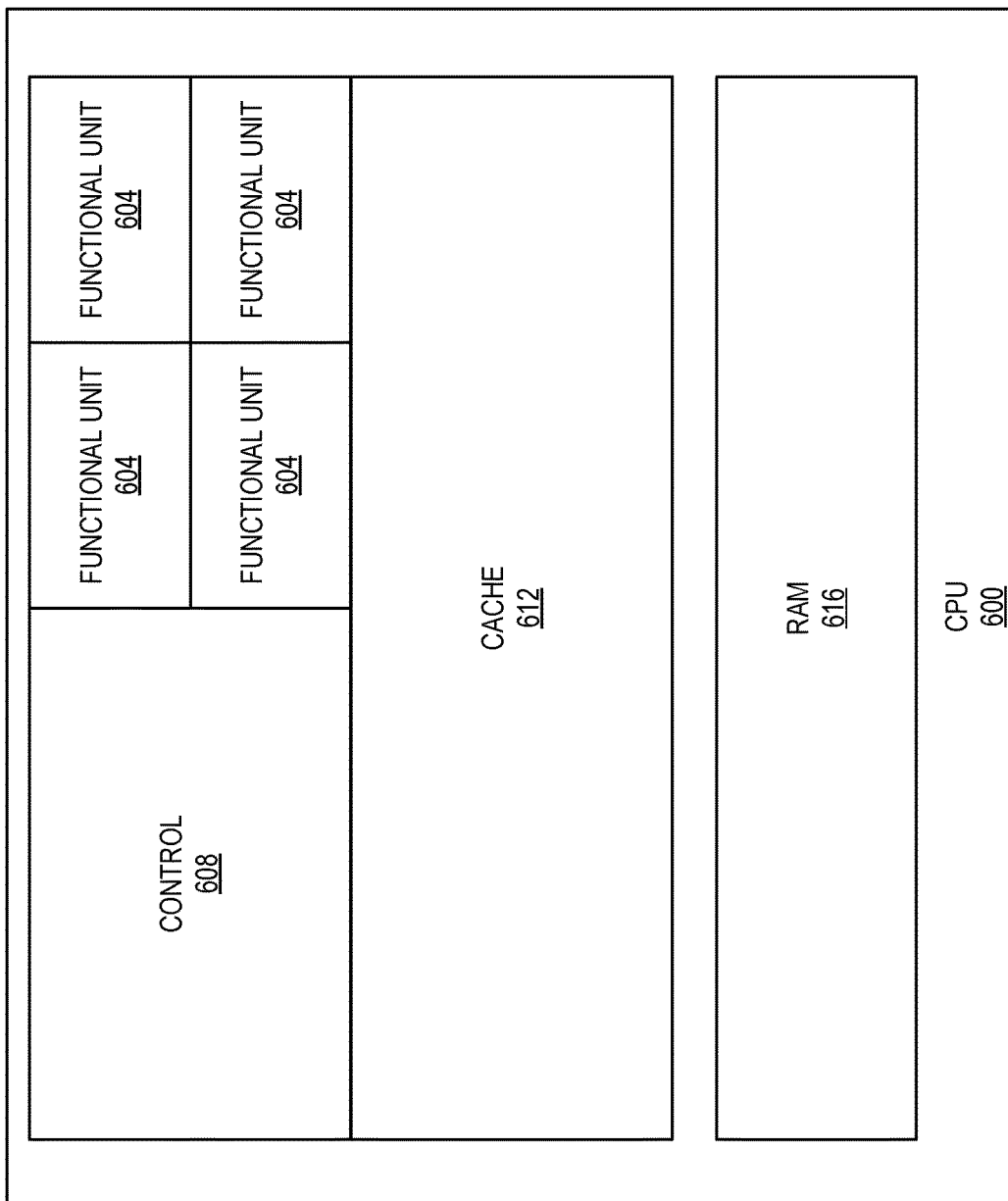
FIG. 6 illustrates an example of a block diagram of a central processing unit (CPU), according to one embodiment.

FIG. 6 illustrates an example of a block diagram of a central processing unit (CPU) 600, according to one embodiment. The CPU 600 can execute software instructions stored in a local and/or external memory. The CPU 600 can include at least one or more of a control components (e.g., control component 608), one or more functional units (e.g., functional units 604), a memory (e.g., cache 612 and random access memory (RAM) 616), or any combination thereof. The control component 608 can direct operation of the CPU 600 by controlling input and output (I/O), instruction scheduling, decoding, a load/store operation, and passing of information on the CPU 600. In addition, the control component 608 can coordinate processing of an instruction through an internal clock and generation of timing signals using the functional units 604 (e.g., a synchronize functional unit).

The functional units 604 can represent basic functionality of the CPU 600. In some examples, the functional units 604 can be a unit that performs an operation and/or a calculation as directed by a software instruction and may vary in type and capability. For example, the functional units 604 can be an arithmetic logic unit (ALU), a floating point unit (FPU), a memory interface unit, or the like. An ALU can perform one or more basic arithmetic and/or bitwise operations on one or more integer based binary numbers. By contrast, an FPU can perform one or more arithmetic and/or bitwise operations on one or more floating point numbers (e.g. an approximation of a real number). A memory interface unit can provide the control component 608 with an interface to external memories such as RAM or a hard disk drive (HDD) and on board memory such as the cache 612 and the RAM 616. In some examples, the functional units 604 can include a homogeneous set of one or more ALUs, one or more FPUs, one or more memory interface units, or the like. In other examples, the functional units 604 can include any combination of different types of the foregoing functional units such as, but not limited to, two ALUs, an FPU, and a memory interface unit. Generally, the CPU 600 can be a general execution unit, with low latency, operable to execute any type of instruction. Furthermore, while the CPU 600 depicts four functional units 604, the CPU 600 can include any number of the functional units 604 without departing from the spirit and scope of the present disclosure.

In some examples, the functional units 604 cannot process program instructions stored in persistent memory (e.g., the RAM 616). In such examples, the control component 608 can decode a software instruction stored in memory and pass one or more individual operators, operands, and/or control signals to a functional unit according to an instruction set architecture of the CPU 600. For example, the control component 608 can analyze the software instruction according to the instruction set architecture and determine which one or more bits correspond to an operator and what operator is defined by the one or more bits (e.g. add, subtract, or the like). The control component 608 can operate similarly for an operand and/or a control signal. In some examples, the instruction set architecture can require a fixed length instruction (e.g., all instructions have the same number of bits); however, in some other examples, the control component 608 can be operable to decode variable length instructions (e.g., a first instruction can include a different number of bits as compared to a second instruction). When the instruction set architecture enables variable instruction lengths, the instruction can include multiples of bytes and can include more or less bytes than other instructions. For example, a first instruction can include four bytes (i.e. 32-bits) and a second instruction can include two bytes (i.e. 16-bytes). The control component 608 can identify an end of the variable instruction by recognizing a special character in the last byte. The CPU 600 can expect an instruction according to the instruction set architecture in order to appropriately decode and/or execute a software instruction.

ALUs and FPUs can include at least four inputs, representing two operands, an operator, and at least one control signal (such as a timing signal). A timing signal can enable the control component 608 to manage when a functional unit processes an input. For example, the control component 608 can use a timing signal to force ALUs (or other functional units) to operate simultaneously, in a particular order, asynchronously, or in any other manner as may be necessitated by a software instruction or the control component 608. An ALU or an FPU can output the result of an arithmetic operation and at least one control signal. The output control signal can indicate a status of the CPU 600 and can be used by the ALU or the FPU (as input) in a subsequent computation, passed to another ALU for related operations, or stored in registers. For example, an output signal can indicate that the arithmetic result was negative, zero, or an overflow (e.g. the operation resulted in a number that is too large to represent by the functional unit).

The control component 608 can fetch from a memory (e.g., the cache 612 and the RAM 616), decode, and/or schedule an instruction. The control component 608 can operate an instruction pipeline to schedule one or more decoded instructions on each functional unit in a parallel or semi-parallel manner. For example, a software program that has the following three computations: $x=5+6$, $y=1+2$, $z=x+y$, can be executed at least partially in parallel. Because $x=5+6$ and $y=1+2$ do not depend on each other, both the x and y computations can be executed in parallel. Yet, the z computation must wait for the first two equations to complete to execute. The instruction pipeline may schedule all three instructions and complete them in as little as two cycles. The control component 608 can manage the scheduling of an instruction to maximize a number of functional units in operation at once, thereby minimizing the total time necessary to produce a final result.

In some examples, a general flow of the control component 608 can include fetching one or more instructions from the memory, decoding and parsing the one or more instructions, developing an instruction schedule (e.g. through an instruction pipeline), passing the one or more instructions to one or more functional units 604 for processing along with one or more timing signals according to the instruction schedule, receiving results from the one or more functional units 604, and storing the results back in the memory.

The control component 608 can store intermediate results and one or more decoded instructions in the cache 612 or the RAM 616 before processing subsequent instructions. However, the control component 608 can store data according to a memory hierarchy which may prioritize one form of memory over another depending on a type of data to be stored. In some examples, the cache 612 can have a lower cost (e.g. latency and power) due to a proximity of the cache 612 with the control component 608 and the one or more functional units 604. In such examples, the control component 608 can prioritize the cache 612 over the RAM 616 when data is loaded imminently or frequently. Because the cache 612 can be finite and valuable, data that may not be required immediately may be stored in the RAM 616, or in external non-volatile memory (not-shown). For example, given the computation example above and only a single ALU. The control component 608 can fetch the first computation (e.g. x=5+6) and pass it to the ALU for processing and return the result to the cache 612. The control component 608 may then pass the second computation (e.g. y=1+2) to the ALU and store the result of the second sub-computation in the cache 612, then fetch the last computation (e.g. z=x+y) along with the result from the first and second computations. The results of the last instruction represent the completed instruction and may not be needed immediately and may therefore be stored in the RAM 616 or externally in non-volatile memory.

The cache 612 can be any random access memory that provides a reduced latency for one or more load and store operations. For example, the cache 612 can be static random-access memory (SRAM). In some examples, the CPU 600 can include multiple cores (e.g. two cores, four cores, eight cores, or more) wherein each core can include a control component (e.g., the control component 608), one or more functional units (e.g., the functional unit 604), and a cache (e.g., the cache 612). In such examples, the CPU 600 can further include an overall cache (not shown) that can be shared by the multiple cores.

In some examples, the cache 612 can include one or more levels (e.g., L1, L2, L3, and L4) in which the L1 cache has the lowest access latency and the L4 cache has the highest access latency. In some examples, the L1 cache can represent the cache 612 which is not shared by other cores of the CPU 600, but is exclusive to a particular CPU core. In such examples, the L2-L4 caches can be part of the overall cache that is shared between the multiple cores of the CPU 600. The L4 cache can be internal or external to the CPU 600 and can include SRAM or any other type of RAM, such as dynamic RAM (DRAM) or embedded dynamic RAM (eDRAM). The CPU 600 can include one or any number of cores and any number or type of memories, including cache memory with various levels.

Figure 7:
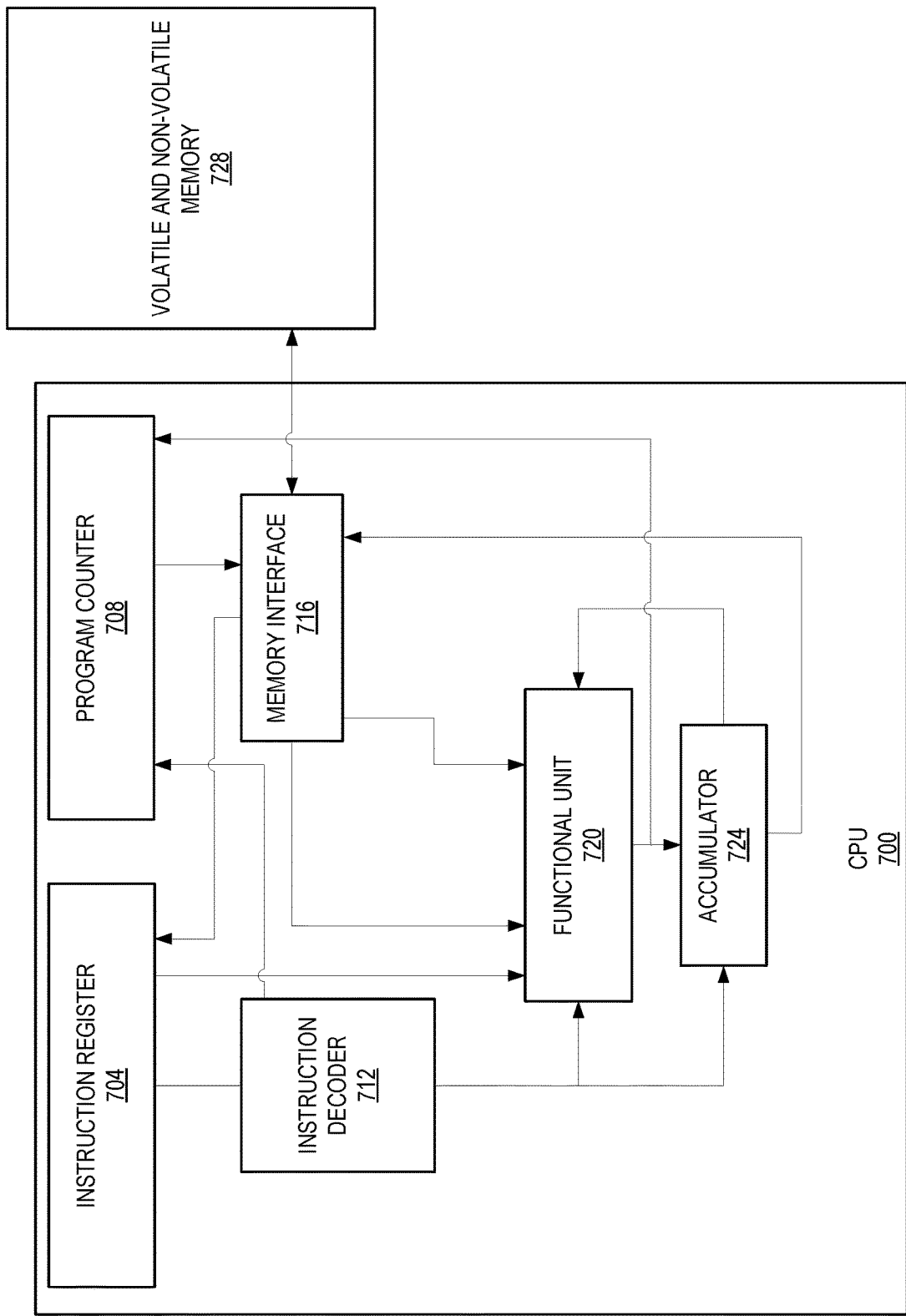
FIG. 7 illustrates an example of a block diagram of internal components of a central processing unit (CPU), according to one embodiment.

FIG. 7 illustrates an example of a block diagram of internal components of a CPU 700 (e.g., the CPU 600 of FIG. 6), according to one embodiment. As noted above, the general flow of the CPU 700 can be to fetch, decode, and execute. The process of executing an instruction can begin with a program counter 708, which can control an order of execution for one or more instructions in a program. A current program counter value of the program counter 708 can be an address location of an instruction to be executed. The current program counter value can be passed to a memory interface 716, which can enable access to an internal and/or external memory of the CPU 700. The memory interface 716 can access an address associated with the program counter value in a memory 728 and pass the instruction to an instruction register 704. The memory 728 may be volatile and/or non-volatile memory. The instruction register 704 can be short term memory with low access latency (such as the cache 612 of FIG. 6). The instruction register 704 can pass the instruction to a functional unit 720 or to an instruction decoder 712 if the instruction needs to be decoded.

The instruction decoder 712 can manage execution of the functional unit 720 according to the instruction set architecture of the CPU 700. The instruction decoder 712 can take in a binary number composed of one or more bits from the instruction register 704 and identify bits corresponding to a first operand, a second operand, an operator and a storage location. There can be different types of instruction set architectures and each one can follow a different convention.

For example, for an instruction that adds a constant to a variable in a reduced instruction set computing (RISC) architecture (where the instruction length is 32-bits), the first 6 bits can correspond to an operator (e.g. add in this example), the next 5 can correspond to a storage address of the result, the next 5 can correspond to a first operand, and the last 16 can correspond to a constant. The instruction decoder 712 can expect an operator, one or more operands, and other aspects of an instruction to appear in a particular order. The instruction decoder 712 can operate on any instruction set architecture provided the instruction set architecture is known to the instruction decoder 712. The operator and operands, once decoded, can be passed to the functional unit 720, which can execute the operation.

The functional unit 720 (e.g. ALU, FPU, etc.) can receive input from the instruction decoder 712 and produce an output. If the output represents a conclusion of the instruction, the output can pass the output to the memory interface 716 (which stores the output in a memory 728) or in the instruction register 704 if the output is used by a following instruction. If the instruction is incomplete, the output of the functional unit 720 can pass the result to an accumulator 724. The accumulator 724 can be a register that stores intermediate arithmetic and logic. The accumulator 724 can accumulate the output of the functional unit 720 for one or more operations that require multiple passes through the functional unit 720. Each iteration of the functional unit 720 can be passed to the accumulator 724 so that it can be reused by the functional unit 720 in a subsequent iteration or once complete passed to the memory interface 716 for storage. For example, if an ALU is executing the instruction y=5^2, the ALU can process the instruction as y=5+5+5+5+5; however, because the ALU can only take two operators per operand, the ALU can execute the add operation four times. In such an example, the ALU can processes 10+5 on the second iteration, 15+5 on the third iteration, and 20+5 on the last iteration. Once the final result is reached (i.e., 25), the output from the accumulator can be stored in the memory 728. The functional unit 720 and the accumulator 724 can also process multiplication using shift-and-add in a binary operation. When the functional unit 720 processes the last iteration of the operation, the result can be passed to the memory 728.

Once an instruction has completed, the program counter 708 can be incremented by a length of the instruction (e.g. 16-bits, 32-bits, etc.) according to the instruction set architecture so that the program counter value is equal to a next instruction's memory address. The program counter 708 can then load that next instruction through the memory interface 716 and continue the process described above until the program completes.

Figure 8:
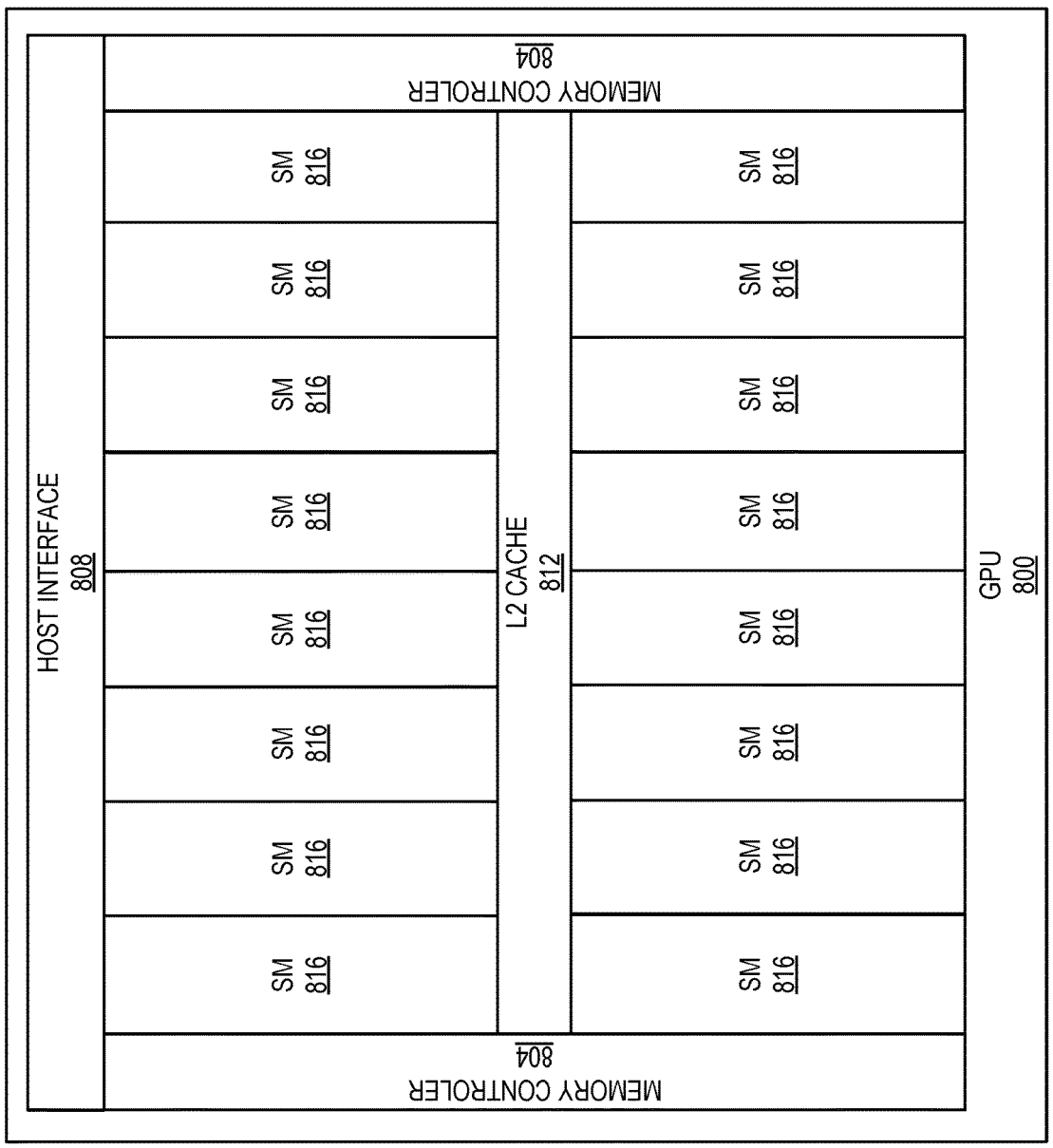
FIG. 8 illustrates an example of a block diagram of a graphics processing unit (GPU), according to one embodiment.

FIG. 8 illustrates an example of a block diagram of a graphics processing unit (GPU) 800, according to one embodiment. It should be noted that while a GPU is specifically mentioned throughout this disclosure, a VPU can be used to replace the functionality of the GPU in some examples. In some examples, the GPU 800 can be a microprocessor. In such examples, a unique architecture of the GPU 800 can provide distinct process capabilities over a CPU (e.g., the CPU 600/700). A differences between the CPU 600/700 and the GPU 800 can relate to an optimization of each hardware element. The CPU 600/700 can be designed to execute a thread (e.g. discrete sub-program of an overall program) with low latency (from fetch to execution) by using a large amount of the cache 612. In contrast, the GPU 800 can be designed to execute a large number of similar instructions in parallel. For example, the GPU 800 can include 16 streaming multiprocessors (SM) 816, where each SM 816 can execute a block of threads in parallel with another SM 816. In some examples, the GPU 800 can execute a number of blocks of threads at once equal to a number of SMs 816. In some examples, the GPU 800 can be more proficient in executing a large number of repetitive operations, maximizing the effectiveness of parallel SMs 816. The GPU 800 can include many SMs 816. While 16 SMs 816 are shown in FIG. 8, GPU 800 may include any number of SMs 816.

In some examples, each SM can share a level 2 (L2) cache 812. By sharing the L2 cache 812, a first SM 816 can use an intermediate result of a second SM 816 when the first SM 816 and the second SM 816 execute in parallel. The L2 cache 812 can enable low latency load/store operations to allow data to pass between different SMs 816.

In some examples, one or more memory controllers (e.g., a memory controller 804) can provide an interface between the SMs 816, the L2 cache 812, and an external device or system (not depicted) through a host interface 808. The memory controller 804 can include random access memory (RAM) with a higher latency than that of the L2 cache 812 for storage of lessor or indefinitely used data. For example, the memory controller 804 can include, but is not limited to, DRAM, SRAM, eDRAM, or the like, or any combination thereof. In some examples, the memory controller 804 might not include any memory, but rather enable the GPU 800 to access external volatile and/or non-volatile memory such as RAM, read only memory (ROM), HDD, flash memory, or the like. In addition, the memory controller 804 can facilitate access to internal RAM or the L2 cache 812 from hardware or software external to GPU 800 through the host interface 808.

In some examples, an instruction executed by the GPU 800 can be received from an external sources such as the CPU 600 of FIG. 6 or the CPU 700 of FIG. 7, a vision processing unit (VPU) (depicted in FIG. 10), or external memory (e.g. RAM, ROM, HDD, flash memory, or the like). The host interface 808 can provide external sources access to computing resources of the GPU 800 by providing an interface. Information received from the host interface 808 can be passed to the memory controller 804, which can pass relevant data to either the L2 cache 812 or to individual SMs 816 as may be needed.

The GPU 800 can differ from an architecture of a CPU (e.g., the CPU 600/700) by being capable of executing a large number of threads concurrently. The memory controller 804 can manage and coordinate concurrent threads that execute on the SMs 816 according to a software instruction. For example, the GPU 800 can be tasked with updating a single frame of 1080p video. In such an examples, the GPU 800 may need to calculate a pixel value for each pixel of the frame (which might include 2,073,600 pixels). For such an instruction, the GPU 800 must solve the same calculation for a pixel over 2 million times. The memory controller 804 can leverage the concurrent processing capabilities of the GPU 800 by distinguishing in a single task, blocks of threads (e.g. one or more threads) where each SM 816 executes a block of threads concurrently. Leveraging the parallel processing capability of the multiple SMs 816, the GPU 800 can provide the calculations to seamlessly render video with a frame rate between 1 and 240 frames per second (or some other frame rate).

In some examples, the GPU 800 can save power by only updating a portion of a frame that has changed values. For example, if a portion of a first frame is black and the same portion of a second frame is the same color, the GPU 800 need not devote resources to calculating and updated values for the portion of the frame that has not changed. In such an example, only the delta (difference between frames) needs to be processed. The memory controller 804 can coordinate threads that execute on the SMs 816 to effectuate the parallel processing abilities of the GPU 800, enabling the GPU 800 to update each frame and display frames according to a frame rate. In some examples, the memory controller 804 can operate similar to a gigathread, which represents a single unifying thread that manages individual threads executing on the many SMs 816. In some examples, the GPU 800 can be a CPU specialized for processing graphics.

Figure 9:
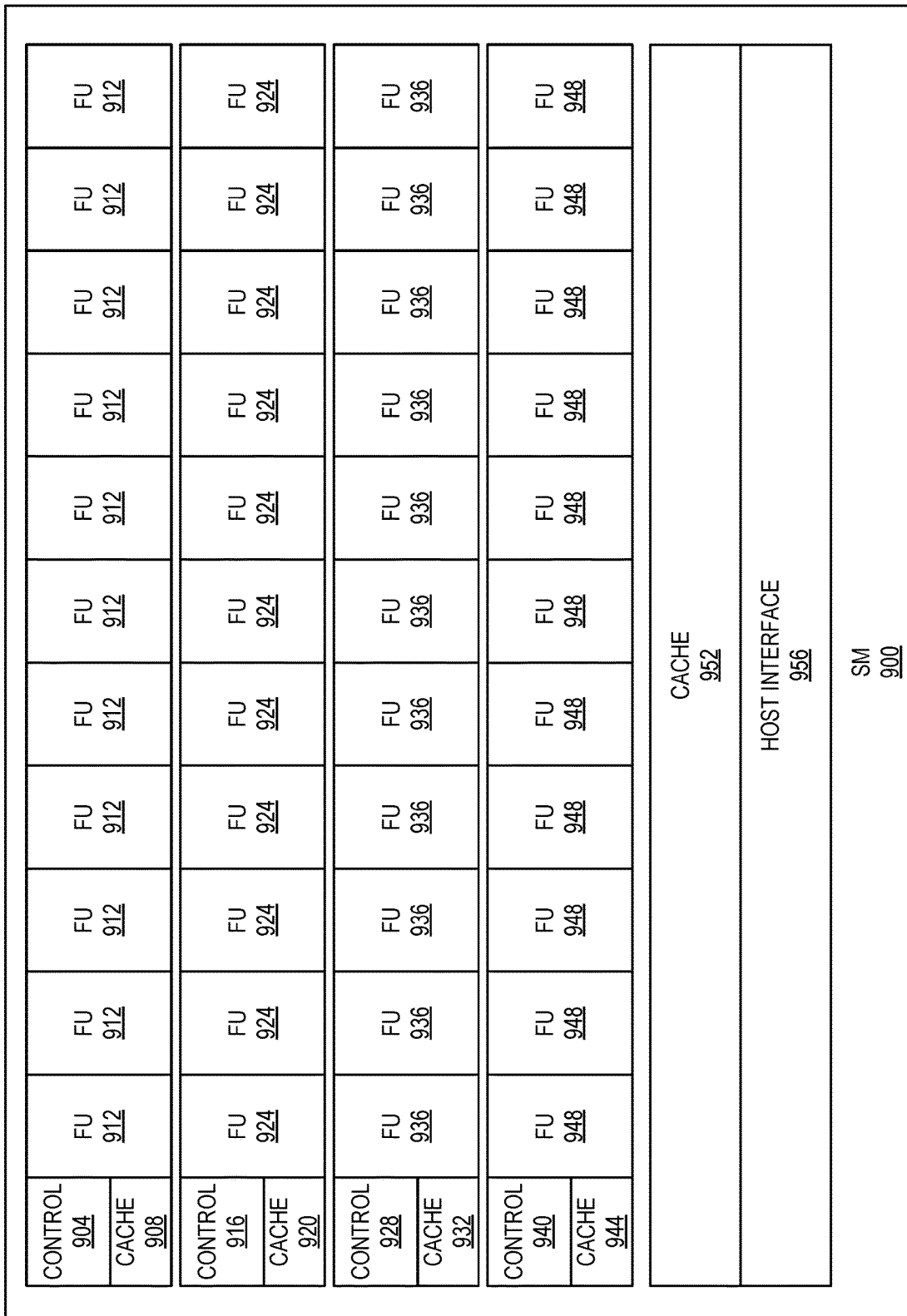
FIG. 9 illustrates an example of a block diagram of a single stream multiprocessor, according to one embodiment.

FIG. 9 illustrates an example of a block diagram of a single streaming multiprocessor 900 (such as the streaming multiprocessors 816 of FIG. 8), according to one embodiment. The single SM 900 can include multiple execution blocks (e.g. a control component, a cache, and one or more functional units can be a single execution block), where each execution block can execute a single thread. FIG. 9 depicts four execution blocks: a first block including a control component 904, cache 908, and functional units 912, a second block including a control component 916, cache 920, and functional units 924, a third block including a control component 928, cache 932, and functional units 936, and a fourth control component 940, cache 944, and functional units 948. A SM can include any number of execution blocks. In some examples, the single SM 900 can execute a block of threads by assigning each thread within the block of threads to an execution block. In such examples, each block of threads can execute concurrently and complete within the time a single thread takes to execute. In some examples, a memory capacity of a cache of an execution block can be limited (e.g., the cache 908 can be smaller than a cache 952, which can be smaller than the L2 cache 812 of FIG. 8). The cache of an execution block can store one or more operators, operands, timing and/or status signals, or any combination thereof that are passed to each functional unit (e.g. FU 912). The cache of an execution block can also store a result (intermediate or final) from each functional unit. A control component (similar to the control component 608 of FIG. 6) can follow an instruction execution cycle of fetch, decode, and execute. The control component 608 can fetch one or more instructions in its cache (i.e., the cache 908, 920, 932, 944) and decode the one or more instructions according to an instruction set architecture utilized by the single SM 900. Any instruction set architecture can be employed by the execution block provided that the decoder in control has the corresponding decoding capability to decode the instruction set architecture. The control component can pass a decoded instruction to a functional unit that is associated with the control component. For example, the control component 904 can pass one or more decoded instructions to the functional units 912 while a control component 916 can pass one or more decoded instructions to the functional units 924, and so forth.

The result of a set of instructions (once decoded and executed by one or more functional units) can be stored in a local cache of an execution unit before being passed to the cache 952. In some examples, the caches 908, 920, 932, and 944 can represent level 1 (L1) cache as each cache is not shared between other execution blocks. In such examples, the cache 952 can represent level 2 (L2) cache because it can be shared among the many execution blocks. For example, a host interface 956 can receive a thread block from the memory controller 804 of FIG. 8 and store the corresponding threads in the cache 952 prior to distribution. In some examples, each thread of the block of threads can be distributed to each execution block. In some examples, a block of threads can include the same number of threads or fewer than the number of execution blocks in the single SM 900. An execution time for each block of threads can be equal to an execution time of the longest individual thread. In other examples, a block of threads can include more threads than the single SM 900 has execution blocks. In such examples, the single SM 900 can schedule threads among the execution blocks in a manner that minimizes the execution time by, for example, scheduling a shortest thread and a longest thread to execute on the same execution block.

The results of completed threads can be stored in the cache 952 and subsequently passed to the host interface 956 to be passed to the memory controller 804. In some examples, intermediate results of each thread can be passed through the host interface 956 as each thread completes. In other examples, the single SM 900 can wait until an entire block of threads is complete before passing a result of each entire block of threads to the memory controller 804.

Figure 10:
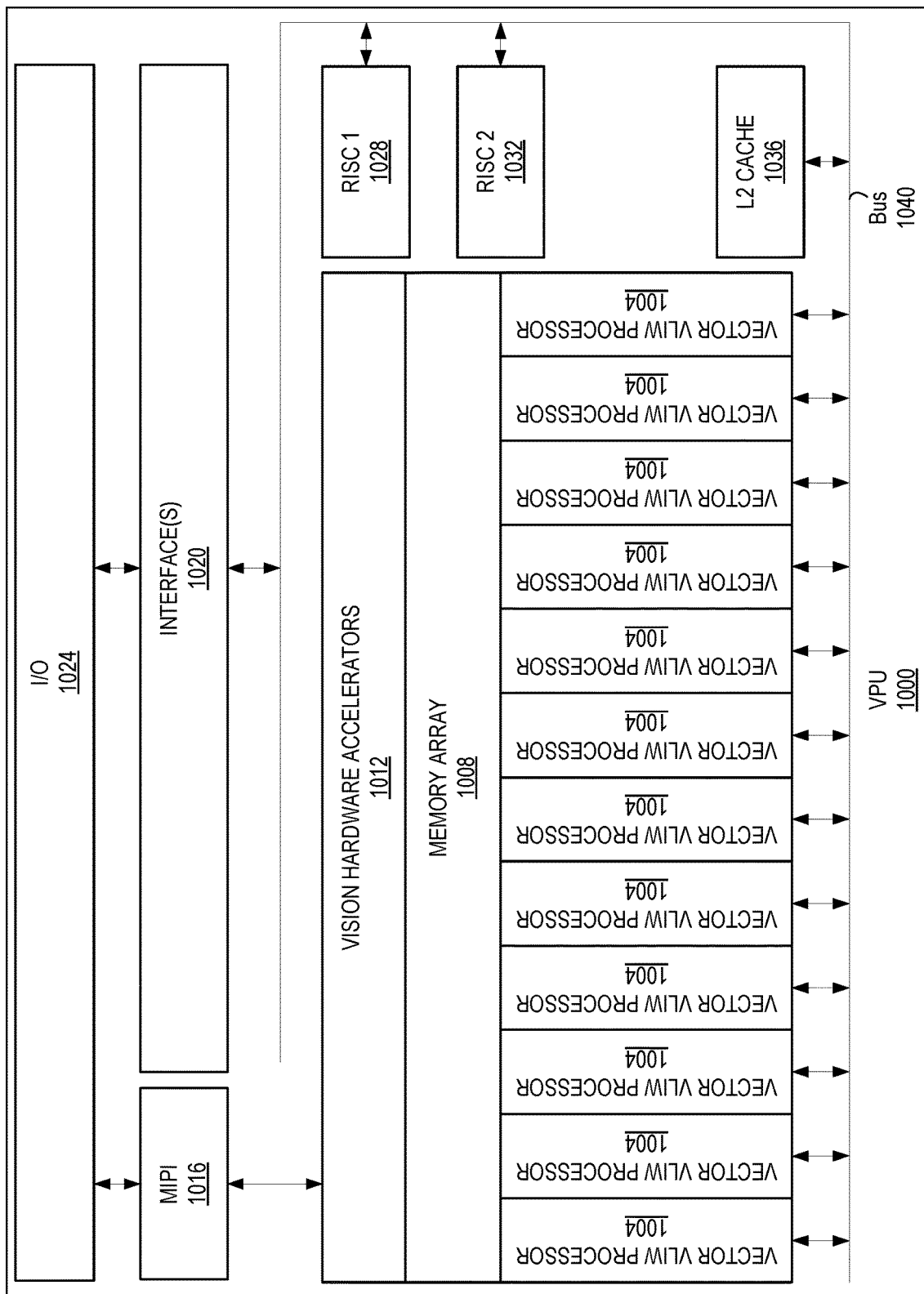
FIG. 10 illustrates an example of a block diagram of a vision processing unit (VPU), according to one embodiment.

FIG. 10 illustrates an example of a block diagram of a vision processing unit (VPU) 1000 to manage input from one or more sensors (e.g., the always-on sensor 114, the vision sensor 116, the combination sensor 118, video and still cameras, accelerometers, time of light, etc.). It should be noted that while a VPU is specifically mentioned throughout this disclosure, a GPU can be used to replace the functionality of the VPU in some examples. The VPU 1000 can include an array of processors to process instructions concurrently. The array of processors can be operable to process large quantities of raw data by executing one or more instructions on entire data sets at once rather than individual operands. In some examples, a processor of the array of processors can be a Vector very long instruction word (VLIW) processor 1004. The Vector VLIW processor 1004 can operate on one or more arrays of data called vectors rather than scalars (e.g. singular data) that a CPU (e.g. the CPU 600 of FIG. 6) can process. In addition, The Vector VLIW processor 1004 can use a VLIW instruction set architecture wherein each instruction length may be 64-bits or larger. In some examples, the VLIW instruction set architecture can be a variable VLIW architecture in which instructions can have varying bit lengths. In some examples, the array of processors can be single SM such as those depicted by FIG. 9 and used by the GPU 800.

A processor of the array of processors can include internal cache memory, a memory array 1008, L2 cache 1036, or any combination thereof. The memory array 1008 can represent a large amount of interconnected nodes made up of RAM (e.g. DRAM, SRAM, or the like) that operate as a large bank of shared memory for each processor of the array of processors, one or more vision hardware accelerators 1012, and one or more reduced instruction set computing (RISC) processors (e.g., RISC 1 1028 and RISC 2 1032). In some examples, the array of processors can use a tightly-coupled address space to reduce load latency and increase storage. In some examples, the one or more vision hardware accelerators 1012 can be a specialized hardware element specifically designed for a particular type of calculation to thereby reduce a load of the particular type of calculation on a processor of the array of processors. A hardware accelerator (e.g., the one or more vision hardware accelerators 1012) can provide fast processing of one or more specific instructions. In some examples, a hardware accelerator can be preferable over executing the one or more specific instructions by a processor of the array of processors when the processor can be slow to execute the one or more specific instructions (or is otherwise less than suitable for the particular instruction type). In some examples, the VPU 1000 can include as many as 20 hardware accelerators that offload some of the processing from the array of processors. In some examples, the one or more vision hardware accelerators can be controlled by a RISC processor through the array of processors.

A bus 1040 can connect the array of processors, the L2 cache 1036, the RISC 1 1028, the RISC 2 1032, and one or more interfaces 1020. The L2 cache 1036 can represent shared memory among the array of processors, the RISC 1 1028, and the RISC 2 1032. In addition, the one or more interfaces 1020 can store external data from an input/output (I/O) interface 1024 in the L2 cache 1036 for processing with one or more of the processors of the VPU 1000. In some examples, the RISC 1 1028 and the RISC 2 1032 can each be reduced instruction set computing processors that control a sub-components of the VPU 1000. For example, the RISC 1 1028 can manage the one or more vision hardware accelerators 1012 while the RISC 2 1032 can manage the I/O interface 1024 and any connected sensors (e.g. cameras and sensors).

In some examples, control of the VPU 1000 can be decentralized in which RISC 1 1028 and/or RISC 2 1032 can manage the I/O interface 1024, peripherals, and the one or more vision hardware accelerators 1012. In some examples, a single RISC processor can manage the VPU 1000 by taking on the role of both the RISC 1 1028 and the RISC 2 1032. One or more external sensors can be managed by the RISC processor(s) and can be controlled in order to effectuate the needs of the VPU 1000. In some examples, the VPU 1000 can modify a rate at which a sensor of the one or more external sensors input data. For example, the VPU 1000 can reduce power consumption of a camera by altering the rate at which the camera captures video. For another example, the VPU 1000 can manage a camera, capable of capturing 60 frames per second, so that it captures 24 frames per second. In some examples, the VPU 1000 can reduce or increase a frame rate, or data capture rate, of any connected sensor, including, but not limited to, a camera, an accelerometer, a totem, a location sensor, a gesture sensor, and the like.

In some examples, the one or more interfaces 1020 can operate on one or more wired protocols and/or one or more wireless protocols. For example, the one or more interfaces 1020 can connect to one or more external sources through a universal serial bus (USB) (e.g. USB 2.0, USB 3.0, USB OTG, or the like), joint test action group (JTAG), Ethernet, universal asynchronous receiver transmitter (UART), SD mode (SDIO), or the like. In addition, the one or more interfaces 1020 can enable data exchange of various display types such as, but not limited to, LCD, common intermediate format (CIF), NAL, or the like. The VPU 1000 can additionally use mobile industry processor interface (MIPI) 1016 to provide one or more interfaces for one or more external devices (e.g. the CPU 600, the GPU 800, and/or a sensor). The MIPI 1016 can include one or more independent communication lanes (e.g., 12). The MIPI 1016 can provide a connection from the I/O interface 1024 to the one or more vision hardware accelerators 1012. Connected external devices (such as sensors) can have low latency pass through from the I/O interface 1024 to the one or more vision hardware accelerators 1012. The I/O interface 1024 can pass data to and from one or more external devices (e.g. the CPU 600, the GPU 800, and/or a sensor) and the VPU 1000.

In some examples, the VPU 1000 can be a CPU specialized for processing visual input. In addition, while the VPU 1000 is depicted according to the exemplary hardware elements of FIG. 10, the VPU 1000 can include similar or the same hardware elements of a GPU (such as the GPU 800 as depicted and described in connection with FIGS. 8 and 9). In some examples, one or more operations that are performed by the VPU 1000 can be performed by the GPU 800.

The features described can be implemented in digital electronic circuitry, or in computer hardware, firmware, software, or in combinations of them. The apparatus can be implemented in a computer program product tangibly embodied in an information carrier, for example, in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube), LCD (liquid crystal display), LED (light emitting diode) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other. Although a few implementations have been described in detail above, other modifications are possible.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

Where components are described as being configured to perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

A number of embodiments of the disclosure have been described. Nevertheless, it will be understood that various modification may be made without departing from the scope of the disclosure.

What is claimed is:

1. A method for presenting mixed reality content using a mixed reality device, the method comprising:
   obtaining sensor data associated with a physical environment, wherein the sensor data is obtained using one or more sensors;
   determining, by a visual processing unit (VPU) of the mixed reality device, a pose of the mixed reality device using the sensor data;
   sending the pose of the mixed reality device from the VPU to at least one graphics processing unit (GPU);
   identifying, by the at least one GPU, mixed reality content corresponding to the pose of the mixed reality device;
   determining that the identified mixed reality content is dynamic content;
   sending a message from the at least one GPU to a central processing unit (CPU) operating in a low-power mode, wherein the message causes the CPU to transition from the low-power mode to a high-power mode;
   sending the pose from the VPU to the CPU;
   receiving, at the at least one GPU, the dynamic content from the CPU;
   aligning, by the at least one GPU, the dynamic content to the physical environment;
   sending the aligned dynamic content from the at least one GPU to the mixed reality device; and
   presenting the aligned dynamic content using a display of the mixed reality device.

2. The method of claim 1, wherein the pose of the mixed reality device includes a position and an orientation of the mixed reality device.

3. The method of claim 1, wherein the at least one GPU is remote from the mixed reality device.

4. The method of claim 3, wherein the at least one GPU and the CPU are located with a battery pack.

5. The method of claim 1, wherein the mixed reality content is stored in a cache of the at least one GPU prior to identifying the mixed reality content.

6. The method of claim 1, wherein a cache of the CPU is utilized in rendering of the dynamic content.

7. The method of claim 1, wherein the at least one GPU and the CPU are located with the mixed reality device.

8. A system comprising:
a device including:
one or more sensors, wherein a sensor of the one or more sensors is configured to capture sensor data;
a vision processing unit (VPU) configured to determine a pose associated with the device, wherein the pose is determined using the sensor data, wherein the VPU is further configured to send the pose to at least one graphics processing unit (GPU) and a central processing unit (CPU); and
a display;
wherein the at least one graphics processing unit (GPU) is configured to:
receive the pose from the VPU;
identify mixed reality content to be presented by the display, wherein the mixed reality content is identified based on the pose;
determine that the identified mixed reality content is dynamic content;
send a message from the at least one GPU to the CPU operating in a low-power mode, wherein the CPU receives the pose from the VPU and the message causes the CPU to transition from the low-power mode to a high-power mode;
receive the dynamic content from the CPU;
align the dynamic content to a physical environment; and
transmit the aligned dynamic content to the device to be presented by the display.

9. The system of claim 8, wherein the pose is in a configuration space of the device, and wherein the pose defines a position and an orientation of the device.

10. The system of claim 8, wherein a sensor of the one or more sensors is one of a camera, an accelerometer, a gyroscope, a totem, and a global positioning system.

11. The system of claim 8, wherein the at least one GPU is remote from the device.

12. The system of claim 11, further comprising a battery pack, wherein the at least one GPU and the CPU are located with the battery pack.

13. The system of claim 8, wherein a cache of the CPU is utilized in rendering of the dynamic content.

14. The system of claim 8, wherein the at least one GPU and the CPU are located with the device.

15. A computer-program product tangibly embodied in a non-transitory machine-readable storage medium, including instructions that, when executed by one or more processors, cause the one or more processors to:
obtain sensor data associated with a physical environment, wherein the sensor data is obtained using one or more sensors;
determine, by a vision processing unit (VPU), a pose of a device using the sensor data;
send the pose of the device from the VPU to at least one graphics processing unit (GPU);
identify, by the at least one GPU, mixed reality content corresponding to the pose;
determine that the identified mixed reality content is dynamic content;
send a message from the at least one GPU to a central processing unit (CPU) operating in a low-power mode, wherein the message causes the CPU to transition from the low-power mode to a high-power mode;
send the pose from the VPU to the CPU;
receive, at the at least one GPU, the dynamic content from the CPU;
align, by the at least one GPU, the dynamic content to the physical environment;
send the aligned dynamic content from the at least one GPU to the device; and
present the aligned dynamic content using a display.

16. The computer-program product of claim 15, wherein the pose is in a configuration space of the device, and wherein the pose define a position and orientation of the device.

17. The computer-program product of claim 15, wherein a sensor of the one or more sensors is one of a camera, an accelerometer, a gyroscope, a totem, or a global positioning system device.

18. The computer-program product of claim 15, wherein the at least one GPU is remote from the device.

19. The computer-program product of claim 18, wherein the at least one GPU and the CPU are located with a battery pack.

20. The computer-program product of claim 15, wherein a cache of the CPU is utilized in rendering of the dynamic content.

21. The computer-program product of claim 15, wherein the at least one GPU and the CPU are located with the device.

* * * * *